May 21, 1968      I. BROVERMAN      3,384,481

METHOD OF FORMING COMPOSITES OF THERMALLY UNSTABLE MATERIALS

Filed July 6, 1967      2 Sheets-Sheet 1

INVENTOR
IRWIN BROVERMAN
BY
ATTORNEY

INVENTOR
IRWIN BROVERMAN
BY
ATTORNEY

United States Patent Office 3,384,481
Patented May 21, 1968

3,384,481
METHOD OF FORMING COMPOSITES OF THERMALLY UNSTABLE MATERIALS
Irwin Broverman, Chicago, Ill., assignor to P. R. Mallory & Co. Inc., Indianapolis, Ind., a corporation of Delaware
Filed July 6, 1967, Ser. No. 651,617
7 Claims. (Cl. 75—201)

ABSTRACT OF THE DISCLOSURE

The method includes blending a metal powder with another powder material that is thermally unstable to form a mixture, hermetically canning the powder mixture, and consolidating the hermetically-canned powder mixture into a solid mass by mechanical deformation processing at a temperature below the dissociation temperature of the thermally unstable component.

---

In the forming of composites containing a material which is thermally unstable care must be taken in order to prevent dissociation of the material to cause its chemical or physical breakdown. For example, when forming composites of a metal and a second phase dispersion of a metal hydride, care must be taken to prevent dissociation of the hydride during the formation of the composite. Under such conditions, standard powder metallurgy techniques for forming composites, such as cold pressing and sintering, etc., have been found to be unsuitable.

The present invention is concerned with the fabrication of composites containing a thermally unstable material and has as one of its objects the provision of a method of forming such composites wherein the thermally unstable component retains its chemical and physical identity and properties.

Another object of the invention is to provide a method of forming a composite consisting of a metal and a dispersed second phase compound which is thermally unstable.

Yet another object of the invention is to provide a method of forming a composite of such materials wherein powders of the materials are blended to form a mixture and the mixture is subsequently consolidated by deformation processing.

Another object of the invention is to provide such a method wherein the mixture is hermetically sealed in a metal can to form a high free-packing density prior to consolidation by mechanical deformation processing.

Yet still another object of the invention is to provide a method wherein the hermetically-canned mixture is deformation processed to form a composite metallurgically bonded between a cladding consisting of the metal used to form the can.

Another object of the invention is to provide such a method wherein the various process steps are carried out below the temperature needed to retain the chemical and physical properties of the material forming the composite.

With the above and other objects in view, which will appear as the description proceeds, this invention resides in a novel method for forming a composite of a metal and a dispersed second phase compound substantially as described herein, and more particularly defined by the appended claims, it being understood that such changes in the precise embodiment of the invention here disclosed may be made as come within the scope of the claims.

Figure 1:
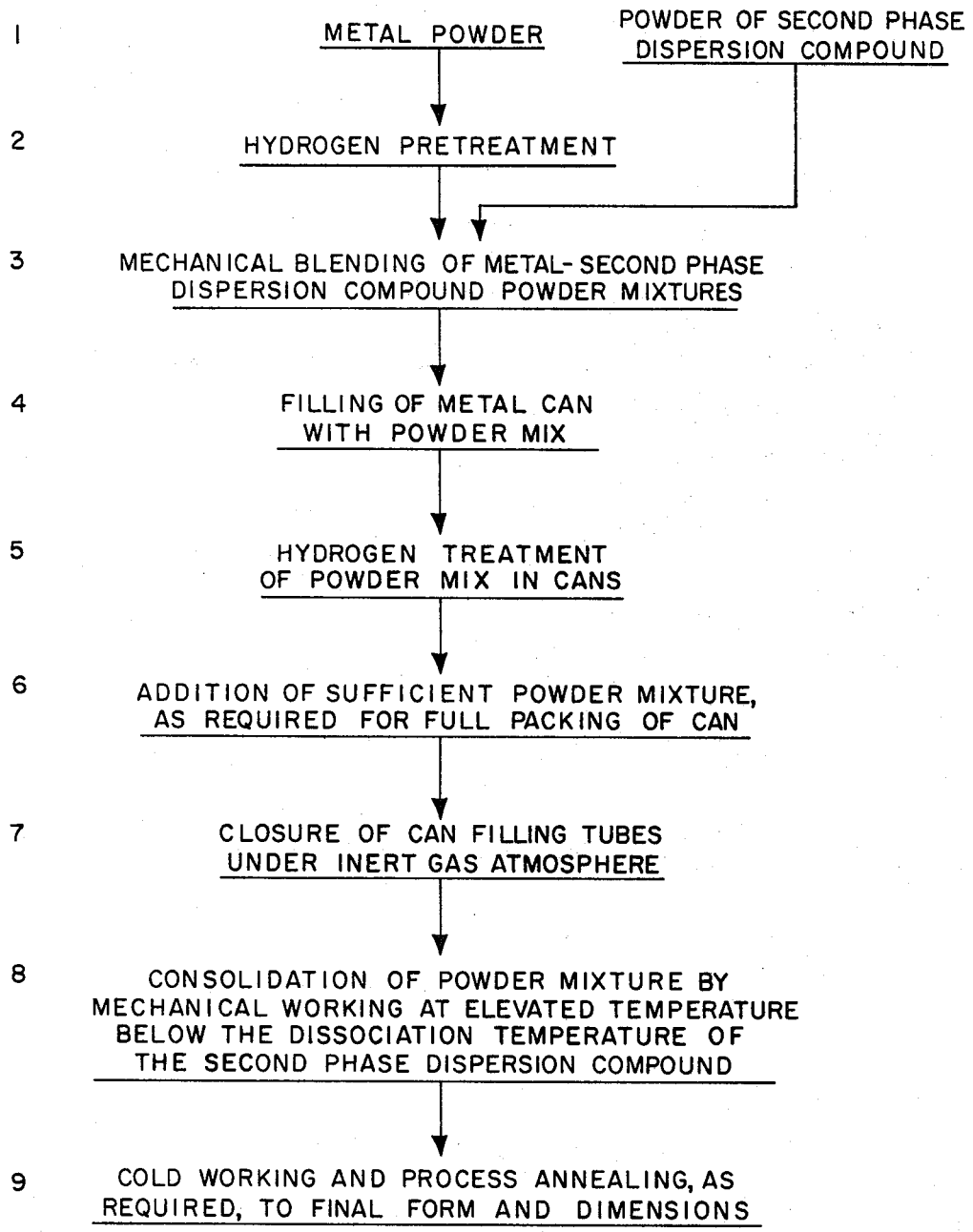
FIGURE 1 is a flow chart showing the steps used in forming the novel material.
Figure 2:
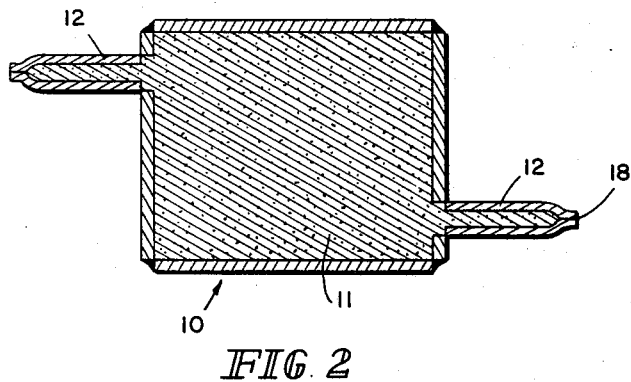
FIGURE 2 is a cross-section of a compacted powder mixture held in a can suitable for use in carrying out the process of the invention.

Generally speaking, the objects of the invention are accomplished by providing a method for forming a composite of a metal and a second phase dispersion compound which comprises blending powders of metal and the compound to form a mixture, consolidating the mixture into a metal can to form a high free-packing density, and mechanical deformation processing the mixture along with the can to a desired shape.

As used hereinafter, the term compound refers to a second phase dispersion compound such as a metal hydride. The term metal includes, but is not necessarily limited to copper, iron, silver and nickel.

Step 1

Referring now to the drawings, the first step in carrying out the invention is to select the proper powders for the composite. The metal powder should be of a commercial grade with 99.5 to 99.7 percent purity. The compound should be in fine powder ($0.1\mu$ to $5\mu$) form with a dissociation temperature that is reasonably high, i.e. above 300° C., to permit ready consolidation with the metal powder in Step 8 below.

Step 2

The metal powder is heated in dry hydrogen to reduce surface oxides, volatilize any organic or inorganic surface films that are applied by the powder manufacturer to inhibit oxidation, and/or to drive off absorbed moisture.

The temperature of such treatment is not critical. A range of 300–500° C. is most effective. A treatment time of 1–2 hours is sufficient.

Step 3

The powders of the metal and the compound are dry blended to produce an intimate, uniform intermixture. Conventional metal powder blending methods and techniques are applicable.

The content of the compound in the mixture can vary upwards to around 20 volume percent. The maximum limit of the compound depends on the following factors;

(a) Blending characteristics
(b) Plasticity and formability requirements.

Step 4

The blended mixture of the powder of the metal and the compound are poured into an all-metal can 10 which is provided with filling tubes 12. The can may be, but not necessarily, formed from the metal of the composite. It should, however, preferably be formed from one of the aforementioned metals of copper, iron, silver and nickel. The can is vibrated during the filling operation so as to promite a high free-packing density mixture 11. When the level of the powder column in the filling tube remains stationary under the influence of the vibration, filling is complete. Can 10 may be of any suitable configuration, such as cylindrical, rectangular, square, etc., depending on the end product desired, as will be hereinafter discussed.

Step 5

During blending, the hydrogen pretreated metal powder may reoxidize and re-absorb moisture. Also, the inner surfaces of the can can be contaminated with an oxide layer and absorbed moisture film. After consolidation of the powders, surface oxide that is internally incorporated can make the material subject to hydrogen embrittlement. Internally entrapped moisture can result in blistering upon subsequent thermal treatment. Consequently, it is preferred procedure to heat the can with contents in dry hydrogen in order to minimize the amount of oxide and moisture present immediately before sealing the can. The temperature of such treatment should be as high as possible without exceeding the dissociation temperature of the compound (see Step 1). Provision of the can with two filling tubes permits the free through-flow of hydrogen.

Step 6

After hydrogen treatment, the powder mixture inside the can may tend to pack more closely because of interparticle surface attraction and adhesion. When this occurs, an adidtional quantity of the pretreated metal compound mixture is added (under vibration as in Step 4) sufficient to fully pack the can.

An optional procedure is to clean the interior surfaces of the can shortly before filling. Hydrogen reduction, chemical or electrochemical treatment may be used. If treated in aqueous solutions, care must be taken to thoroughly dry the inside of the can. When the can has been processed in this manner, then Steps 5 and 6 can be bypassed. If this method is employed, the can need be equipped with only a single inlet filling tube.

Step 7

The filled can is transferred to an environmental chamber equipped with vacuum and atmospheric control system. The chamber is evacauted and then backfilled with a partial pressure of a dry inert gas, such as argon or helium. The filling tubes of the can are crimped and then seam-welded at their ends 18 by the TIG method, making a leak-tight closure. The hermetically sealed can can then be handled in an air atmosphere.

An alternative method is to connect the filled can directly to a vacuum system through the inlet tube. If the can is equipped with two inlet tubes, then, of course, one is to be welded closed before vacuum hook-up. After a vacuum is drawn, the can is backfilled with a partial pressure of argon or helium. The inlet tube is crimped and welded-off, all the while maintaining a positive pressure of inert gas inside the tube.

Step 8

The powder mixture inside the hermetically sealed can is then heated to an elevated temperature and consolidated by mechanical deformation at that temperature. The mechanical working temperature must be kept below the dissociation temperature of the metal hydride. At the same time, it must be high enough to promote consolidation of the powder particles by pressure welding. A mechanical working temperature as low as 500° C. was demonstrated to be highly effective. The minimum amount of mechanical deformation required for good densification is in the order of 75%, in terms of reduction of area. Theoretical density is essentially attainable by the method.

The process is adaptable to a wide variety of mechanical working methods, as for example, extrusion, forging, pressing, rolling, or combinations thereof.

Figure 3:
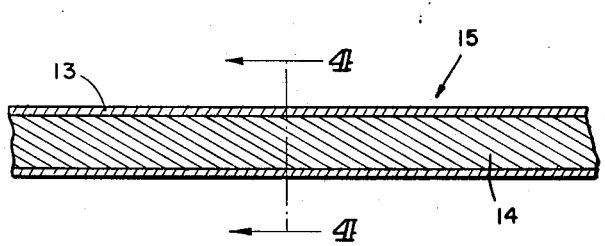
FIGURE 3 is a partial cross-section of the material formed by the method of the invention.
Figure 4:
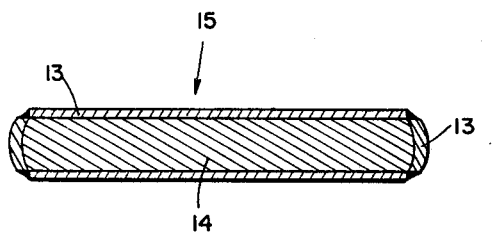
FIGURE 4 is a section taken along line 4—4 of FIGURE 3.
Figure 5:
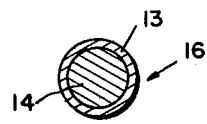
FIGURE 5 is a cross section of the material formed by the method of the invention in rod form.

As is more clearly shown in FIGURE 3, during the elevated temperature deformation processing, the original walls of the can form an integral cladding 13 which is metallurgically bonded to the solid metal-compound composite 14. In the case of processing by forging or rolling, the cladding 13 will be parallel to the flat planar surfaces of the resulting plate 15 shown in FIGURE 4. If a cylindrical can was employed and processing was by axial extrusion, then the cladding 13 would be concentric with the composite core 14 as shown in FIGURE 5 to form a rod 16. The final cladding thickness will be governed by the original can wall thickness and the reduction during deformation processing.

Step 9

A variety of end products may be produced from the consolidated material starting with plate 15 or rod 16 by cold working and process annealing. The plate 15 can be cold rolled to strips or sheets. The sheet can then be blanketed out to form electrical contacts. In like manner, rod 16 can be cold drawn to wire, with the wire being cut into suitable lengths. Each length can then be forged or otherwise formed into electrical contacts.

As an example of the operation of the method of the present invention, copper powder that was pretreated for 2 hours in hydrogen at 500° C. was blended with $ZrH_2$ powder, and the mixture was poured through a filling tube into a closed, precleaned copper can of the type shown in FIGURE 3 under vibration until the can was fully packed. The powders in the can were then placed under vacuum and the filling tube sealed by welding. The sealed, canned powder mixture was hot worked by forging and finished by hot rolling. The hot working temperature was maintained at 500° C., and the total reduction amounted to almost 90%. Samples were made by these procedures, using mixtures of copper powder with about 2.5 and 6.5 volume percent. Metallographic examination showed that excellent densification and good distribution of $ZrH_2$ dispersion were obtained. Coalescence of grains (grain boundry migration) and, therefore, grain boundry cohesion were promoted. As a result, good ductility and formability were achieved. These effects were surprising inasmuch as conventional copper powder metallurgy techniques require high sintering temperatures in the range of 900–1000° C. to attain comparable densification.

From the foregoing description it will be apparent to those skilled in the art that this invention provides a new and useful method of fabricating a composite of a metal and a thermally unstable second phase dispersion compound. Accordingly, it is contemplated that the scope of the invention is to be determined from the claims appended hereto.

What is claimed is:
1. In a method of forming a composite of a first metal and a thermally unstable second phase dispersion compound having a dissociation temperature above 300° C. with a layer of a second metal metallurgically bonded thereto which involves providing said metallurgical bond while pressure welding a mixture of powders of said composite, the improvement which comprises:
 (a) compacting the mixture of the powders of the composite into a container formed of the second metal, there being up to about 20 percent by volume of said mixture of powders of the compound,
 (b) mechanically working the container with the powder mixture at an elevated temperature, but below the dissociation temperature of the compound so as to pressure weld the mixture to form the composite with a layer of the second metal being metallurgically bonded thereto.
2. A method according to claim 1 wherein said first metal is taken from the group consisting of silver, nickel, copper and iron.
3. A method according to claim 2 wherein said second metal used in forming said container is the same as the first metal used in forming the composite.
4. A method according to claim 1 wherein said second phase dispersion compound is a metal hydride.
5. A method according to claim 2 wherein said metal hydride is zirconium hydride.
6. A method of forming a composite of a first metal and a thermally unstable second phase dispersion compound, having a dissociation temperature above 300° C., said composite having a layer of a second metal metallurgically bonded thereto which comprises providing a mixture of powders of said first metal with up to about 20 percent by volume of said mixture of powders of said compound, said powder mixture having been exposed to a reducing atmosphere, providing a container formed from a second metal, substantially fully packing said container with said powder mixture, hermetically sealing said container with said powder mixture under an inert gas atmosphere, and mechanically working said container with said mixture at an elevated temperature but below the dissociation temperature of said compound so as to consolidate said container with said mixture to form a pressure welded composite of said first metal and said compound with a layer of said second metal metallurgically bonded thereto.

7. A method of forming a composite of a first metal and a thermally unstable second phase dispersion compound having a dissociation temperature above 300° C., said composite having a layer of a second metal metallurgically bonded thereto which comprises providing a mixture of powders of said first metal with up to about 20 percent by volume of said mixture of powders of said compound, said powder mixture having been exposed to a reducing atmosphere, providing a container formed from a second metal, substantially fully packing said container with said powder mixture, heating said container with its contents in a reducing atmosphere to minimize the amount of oxide and moisture present, adding a sufficient amount of said powder mixture for full packing of said container, hermetically sealing said container under an inert gas atmosphere, and mechanically working said container with said powder mixture at an elevated temperature but below the dissociation temperature of said compound so as to consolidate said container with said mixture to form a pressure welded composite of said first metal and a layer of said second metal metallurgically bonded thereto.

References Cited

UNITED STATES PATENTS

| | | | |
|---|---|---|---|
| 2,814,564 | 11/1957 | Hayden. | |
| 2,929,707 | 3/1960 | Weeks | 75—201 X |
| 3,024,110 | 3/1962 | Funkhouser | 75—214 X |
| 3,078,553 | 2/1963 | Targert | 75—206 X |
| 3,218,697 | 11/1965 | Wainer | 75—206 X |
| 3,269,804 | 8/1966 | Affleck | 75—201 X |
| 3,276,867 | 10/1966 | Brite | 75—201 X |
| 3,328,139 | 6/1967 | Hodge | 75—214 X |

FOREIGN PATENTS

| | | |
|---|---|---|
| 747,533 | 4/1956 | Great Britain. |
| 879,590 | 10/1961 | Great Britain. |
| 925,142 | 5/1963 | Great Britain. |
| 944,319 | 12/1963 | Great Britain. |

L. DEWAYNE RUTLEDGE, *Primary Examiner.*

CARL D. QUARFORTH, *Examiner.*

A. J. STEINER, *Assistant Examiner.*